United States Patent

Sheets

Patent Number: 5,193,835
Date of Patent: Mar. 16, 1993

[54] BOAT RETAINER

[76] Inventor: Orville G. Sheets, 30450 Hwy, 145, Madera, Calif. 93638

[21] Appl. No.: 746,791

[22] Filed: Aug. 9, 1991

Related U.S. Application Data

[63] Continuation-in-part of Ser. No. 526,520, May 21, 1990, abandoned.

[51] Int. Cl.$^5$ .................................................. B60P 3/10
[52] U.S. Cl. .................................. 280/414.1; 280/508; 414/536
[58] Field of Search ................ 280/414.1, 508–510; 414/536; 403/105, 325, 378; 114/344

[56] References Cited

U.S. PATENT DOCUMENTS

| | | | |
|---|---|---|---|
| 2,441,285 | 5/1948 | Pfieffer | 280/508 |
| 2,503,535 | 4/1950 | Yarbrough | 280/414.1 |
| 3,138,271 | 6/1964 | De Lay | 280/414.1 |
| 3,185,330 | 5/1965 | Buckner | 414/476 |
| 3,390,796 | 6/1968 | Theobald | 414/479 |
| 3,750,805 | 8/1973 | Finney | 414/536 |
| 3,912,302 | 10/1975 | Patterson | 280/508 |
| 3,938,829 | 2/1976 | Anderson | 280/414.1 |
| 3,963,263 | 6/1976 | Whitlock | 280/414.1 |
| 3,989,267 | 11/1976 | Robinson | 280/414.1 |
| 4,114,920 | 9/1978 | Boettcher | 280/414.1 |
| 4,463,965 | 8/1984 | Lawson | 280/414.1 |
| 4,641,851 | 2/1987 | Knies | 280/414.1 |
| 5,000,471 | 3/1991 | Sumrall | 280/414.1 |
| 5,013,206 | 5/1991 | Ernst et al. | 280/414.1 |

Primary Examiner—Margaret A. Focarino
Assistant Examiner—Anne Marie Boehler

[57] ABSTRACT

A trailer mounted boat retaining device that attaches to the bow eye bolt of a boat in order to hold the boat in place on the trailer. The retaining device consists of a Y-shaped set of padded brakets having a locking assembly at the junction. A spring-loaded trigger pin in the locking assembly is pushed by the eye bolt of the boat as it enters the trailer equipped with the invention, so that when the boat moves the pin far enough forward, a separate locking pin springs through the eye bolt of the boat holding the boat in place. A signal plate is provided that emits an audible sound when the locking pin springs into place. A separate safety bolt is also provided to hold the locking pin in place when the trailer holding the invention and boat is in motion.

2 Claims, 3 Drawing Sheets

BOAT RETAINER

This application is a continuation-in-part of application Ser. No. 526,520, filed May 21, 1990, now abandoned.

BRIEF DESCRIPTION OF INVENTION

This invention relates to a device for locking a boat to the boat trailer.

PRIOR ART

It has been common practice to align a boat with the boat trailer and to drive the boat part way on the boat trailer using the winch and rope or cable to complete the loading. This practice often causes accidents while winching the boat to the boat trailer. The most common accident is to slip on the tongue of the wet trailer while winching. Loading a boat with the winch is time consuming and creates long lines at a busy launching ramp.

SUMMARY OF THE INVENTION

The present invention is designed so the locking assembly 78 can be used in combination with a variety of different components. The boat is cradled between two guide rail arms 58 and 59. One end of each of the guide rail arms 58 and 59 is slid into a guide rail bushing 56. The guide rail bushing 56 is fastened on top of pedestal 20, best seen in FIG. 2. The other end of each of the guide rail arms 58 and 59 is fastened to boat trailer 12, best seen in FIG. 1. Each guide rail arm 58 and 59 is covered with a pad 22 to protect the boat. The purpose of the guide rails arms 58 and 59 is to align the boat so the eye bolt 52 located on the bow of the boat will strike the trigger pin 24 in the center, activating the locking pin 26. The one piece locking pin 26 is designed to be nearly trouble free with little maintenance needed. The cylinder cap 32 makes it easy to change locking pin spring 50. The locking body 16 is designed to be nearly trouble free. The locking body 16 is a one piece design which never needs adjusting. The invention is designed to allow for simple replacement of parts.

DETAILED DESCRIPTION

Figure 1:
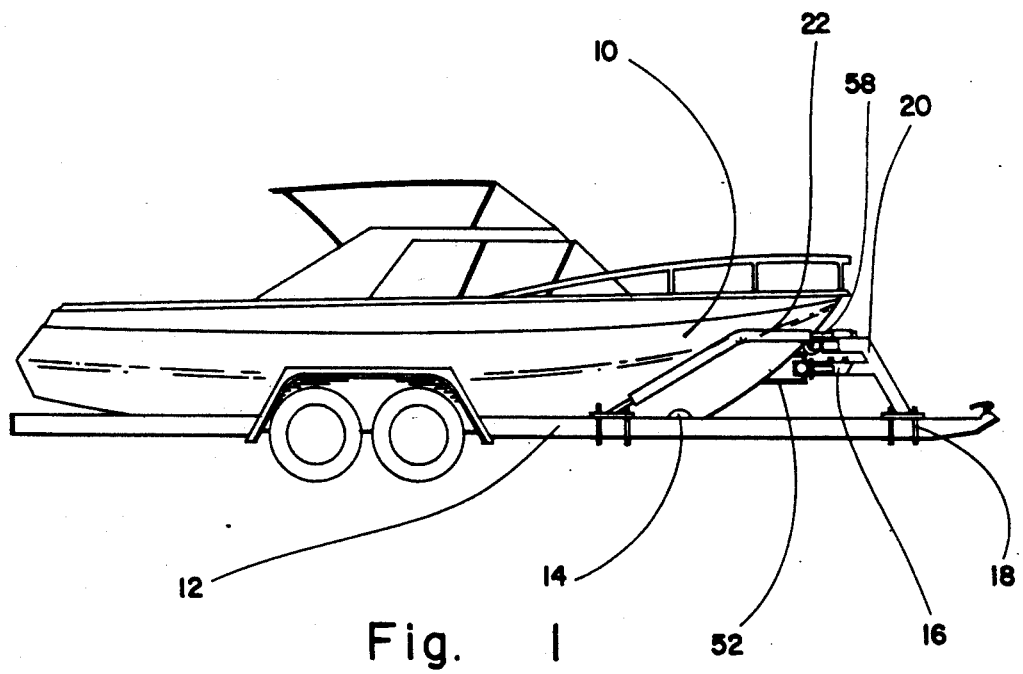
FIG. 1 is a side environmental view of the present invention showing a boat attached to the retainer invention described herein.

The locking assembly 78 consists of a locking body 16 which is a one piece square-like tubing with a V shaped slot at the top and bottom. It is located at the front part of the locking body 16. The purpose of the slot is to allow the front part of the eye bolt 52 to travel past the locking pin 26 striking trigger pin 24 allowing the locking pin 26 to travel through one side of the locking body 16 and through the eye bolt 52 to pass through the other side of the locking body 16, hitting the stop plate 46. This completes the locking of the boat 10 to the boat trailer. The locking body 16 has a locking pin hole 27 in both sides. The hole on one side is covered with a stop plate 46. The hole on the opposite side is covered with a cylinder 28, and fastened outward to align holes in the cylinder 28 with the holes in the locking body 16.

Figures 3, 4, 5:
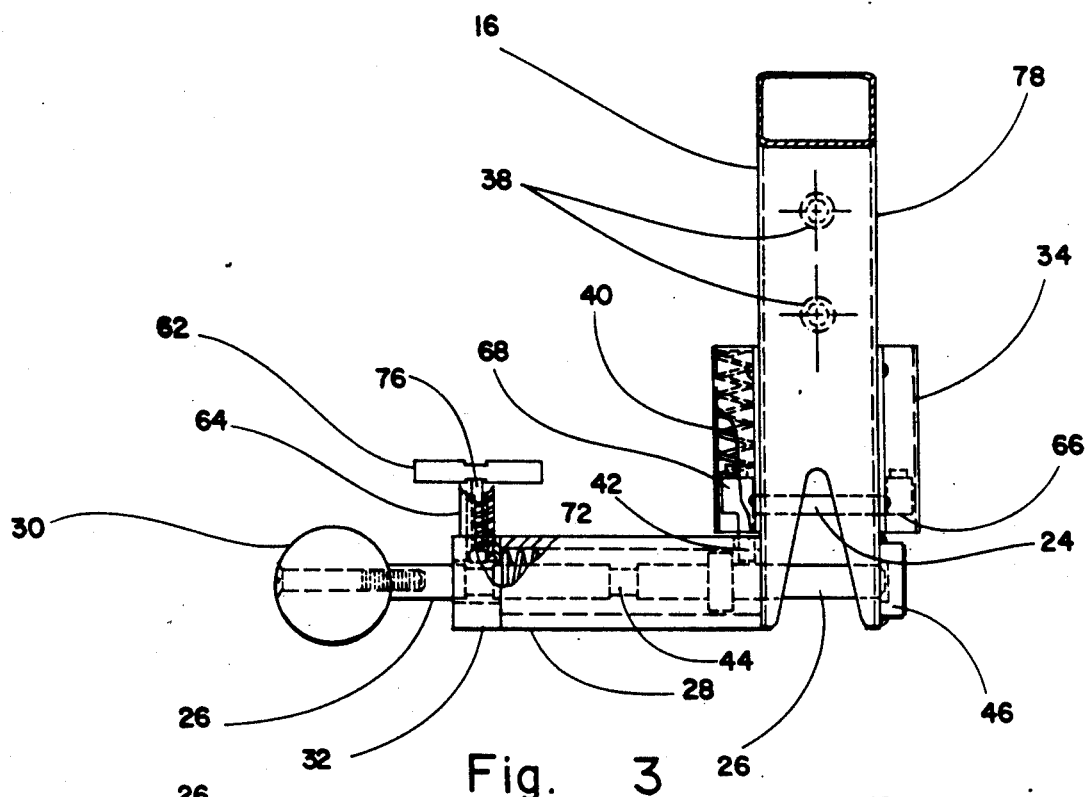
FIG. 3 is a top cutaway view of the locking mechanism of the present invention.
FIG. 4 is a front cutaway view of the locking mechanism of the present invention.
FIG. 5 is a perspective view of the locking mechanism of the present invention.
Figure 6:
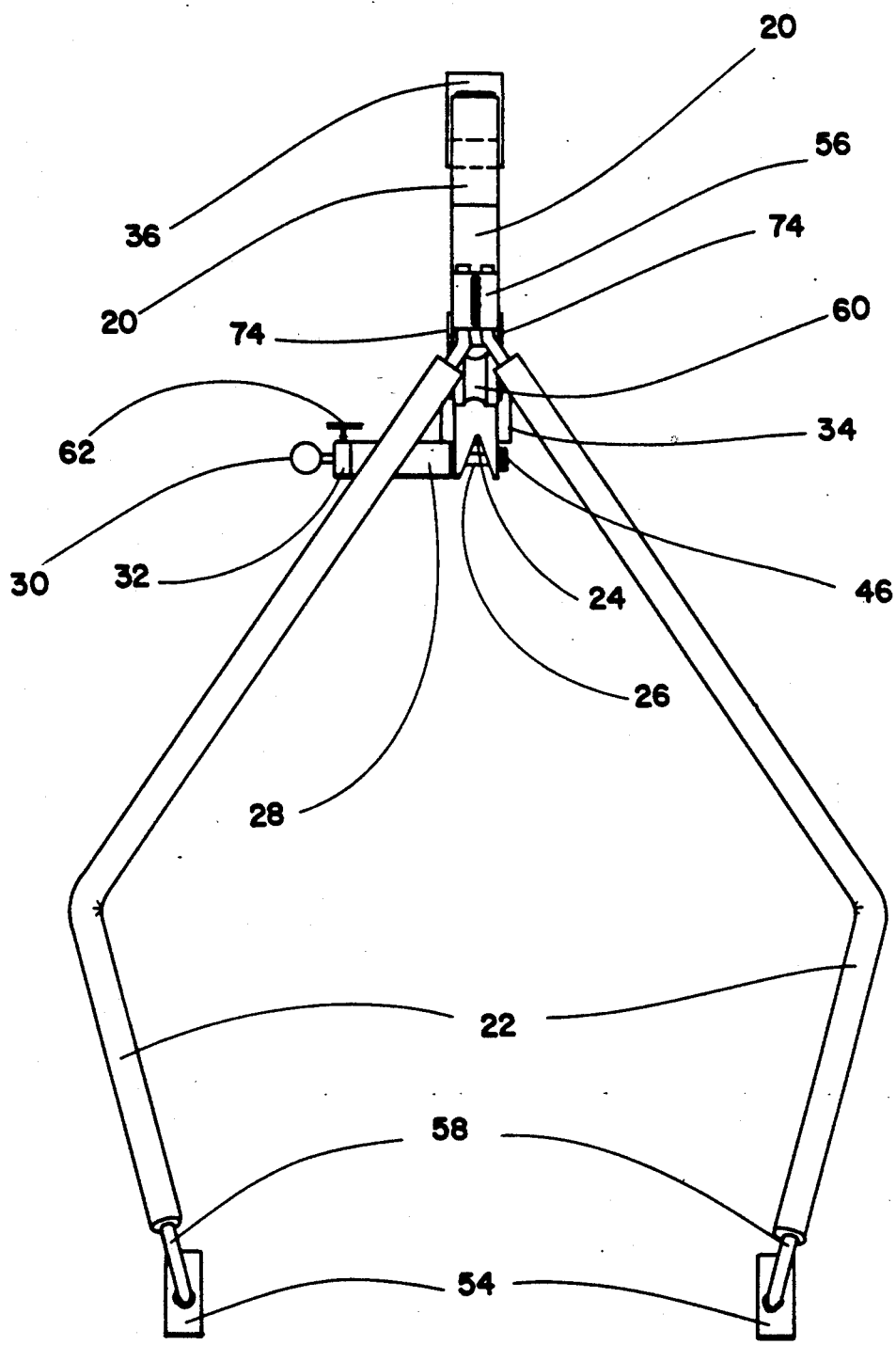

The stop plate has two purposes; one, to stop the locking pin 26 from travelling too far and hitting the handles and two, to audio-signal the operator (when the locking pin 26 strikes the stop plate 46) that the boat is locked to the boat trailer. The locking pin 26 is turned down to make a seat for the locking pin spring 50. The locking pin spring 50 slides over the small part of the locking pin 26. The locking pin 26 and locking pin spring 50 slide into the hole in the cylinder 28, best seen in FIG. 3. The locking pin 26 extends far enough through the cylinder cap 32 to allow handle 30 to be fastened, best seen in FIG. 3. A notch at the bottom of the cylinder 28 allows locking slider 68 to pass through the cylinder. When the locking pin 26 is pulled back in an open position, the pressure from the slider springs 40 force the locking slider 68 to move forward and close the hole in the side of the locking body 16. This blocks the locking pin 26 from closing. Now the boat 10 is ready to launch. Slots on both sides of the locking body 16 line up with the holes in the slider bar 84 so the locking assembly 78 can be adjusted in a forward or backward position to fit various types of boats, by loosening the adjusting bolt 38.

Figure 2:
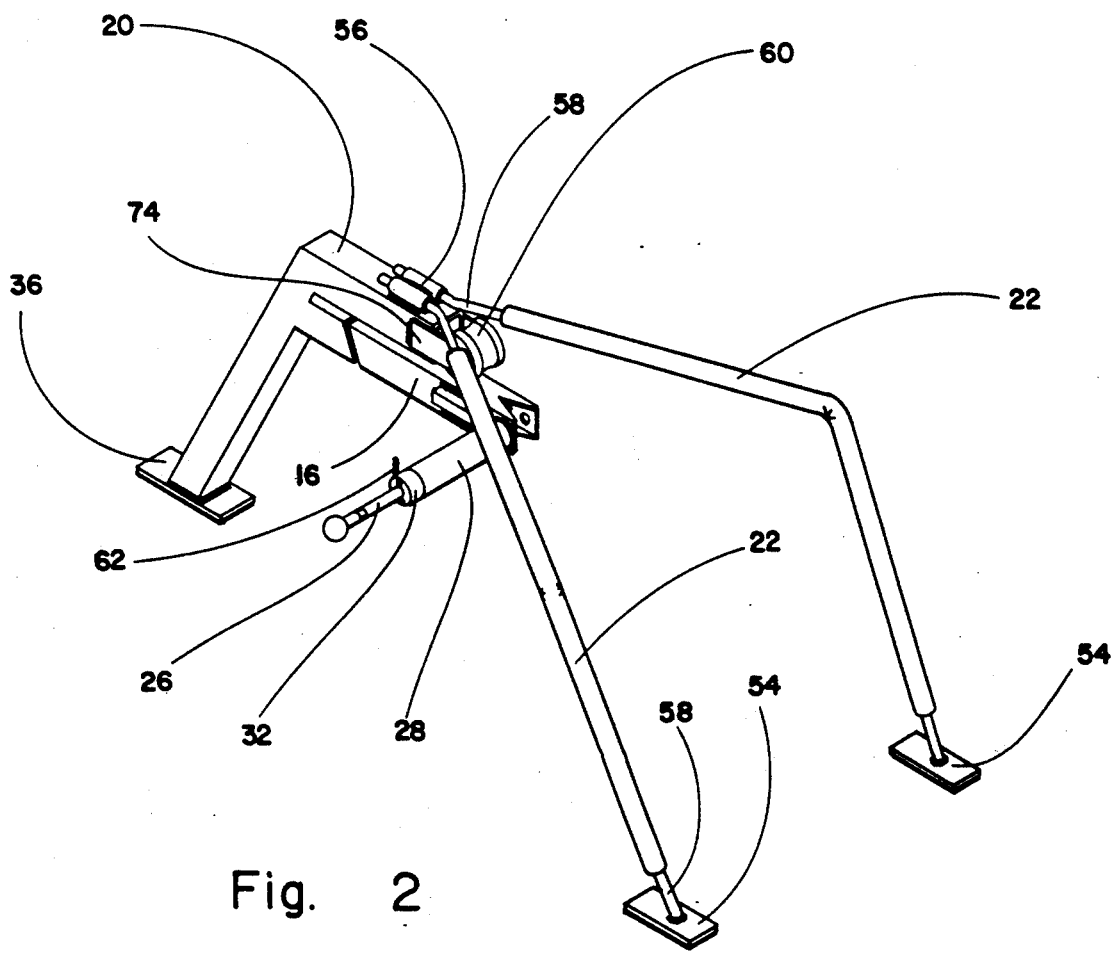
FIG. 2 is a perspective view of the invention.

The safety pin 82 installed in a slot in one side of locking body 16, extends through holes in both sides of slider bar 84, to emerge through the slotted hole on the other side of the locking body 16. This is a safety feature to prevent the locking assembly 78 from sliding off of slider bar 84 attached to pedestal if adjusting bolt 38 works loose, preventing boat from sliding off trailer. On one side of the cylinder cap 32 is a safety bolt 38. Tightening the bolt locks locking pin 26 while traveling. A slider spring cover 34 is designed so that one end of the slider spring rests on one end of slider spring cover 34. The opposite end of slider spring 40 rests on one end of locking slider 40 and slider 66. One end of trigger pin 24 pressed in a hole in locking slider 68. The opposite end of trigger pin 24 slides through a slot in both sides of locking body 16 and is pressed in a hole in slider 66. This keeps trigger pin 24 straight as it moves backward and forward. Slider spring cover 34 also protects slider springs 40 and locking sliders 66 and 68. On a top part of pedestal 20 a roller 60 is installed between two roller brackets 74 which are fastened on both sides of pedestal 20, best seen in FIG. 2. As boat 10 is moved forward slowly, bow of boat 10 rests on roller 60, as the operator increases power, roller 60 forces the bow of boat 10 to move upward until eye bolt 52 hits trigger pin 24 which activates locking pin 26, locking boat 10 to boat trailer 12.

OBJECTS AND ADVANTAGES OF THE INVENTION

The locking assembly is made of one piece of square-like tubing which will never loosen or distort alignment. The boat fastener is designed to adjust to different type boats. The locking pin 26 is made of one piece which differs from the two piece type locking pin inasmuch as in the two piece locking pin, the pin can work loose and get out of line; whereas the one piece locking pin eliminates misalignment. The one piece locking pin 26 requires a cylinder cap 32. The cylinder cap 32 is designed for efficient replacement of parts. Since the two piece locking pin has no cylinder cap, replacement of parts is virtually impossible. The present invention features a stop plate 46, without which, as in the case of prior art, the handle incurs damage on impact. The stop plate 46 in present invention, audio signals vehicle operator, while still in vehicle, that hook-up is complete. Prior art, without this audio signal, requires operator to leave vehicle to visualize hook-up. The locking assembly 78 is nearly trouble free with minimum maintenance required. The boat fastener is inexpensive to manufacture as it requires fewer parts. The fastener is designed to adjust to a variety of boats making it more universal. Guiding arms 58 and 59 allow for more efficient loading in rough water or wind. The boat fastener has a built-in guiding arm which makes for more precision hook-up.

I claim:

1. A trailer-mounted boat retaining assembly comprising:
   c. a Y-shaped support assembly having a rotatable roller mounted at the inside junction of said Y for receiving the pointed bow of a boat hull;
   d. a locking assembly slidably mounted on said support assembly immediately below said roller for attachment to the eye bolt on the bow of said boat, said locking assembly comprising:
   (1) a first hollow horizontal housing one end of which is slidably attached to said support assembly, the opposite end of which having a V-shaped opening therein immediately below the roller;
   (2) a second hollow horizontal housing, one end of which is attached perpendicularly to the side of said first tube at the V-shaped end, both ends of which having openings therein;
   (3) a movable rod extending into said second housing through the openings therein, said rod having a handle on the end thereof outside said housing, and a locking pin on the other end thereof which extends across said V-shaped opening of said first housing;
   (4) spring means located within said second housing and attached to said rod for causing said rod to extend across said V-shaped opening;
   (5) a slidable trigger pin mounted within said first housing at the tip of said V-shaped opening;
   (6) a pair of small housing mounted on opposite sides of said first housing adjacent to said trigger pin;
   (7) a spring-loaded slidable block piece attached to one end of said trigger pin and located in the first of said pair of small housings which is adjacent to said second hollow horizontal housing, said block piece extending into said second horizontal housing and preventing said rod from passing into said V-shaped opening when said block piece is fully extended;
   (8) a separate slidable piece attached to the opposite end of said trigger pin and located in the second of said pair of small housings; and
   (9) a safety locking screw means attached to said second housing for holding said rod in place during transit.

2. The invention described in claim 1 wherein a signal plate is mounted on said first hollow housing opposite said rod, such that when said rod slides across said V-shaped opening, an audible clank is heard. i

* * * * *